United States Patent [19]

Sullivan

[11] Patent Number: 5,018,740

[45] Date of Patent: May 28, 1991

[54] GOLF BALL CORE

[75] Inventor: Michael J. Sullivan, Chicopee, Mass.

[73] Assignee: Spalding & Evenflo Companies, Inc., Tampa, Fla.

[21] Appl. No.: 537,836

[22] Filed: Jun. 13, 1990

[51] Int. Cl.$^5$ .............................................. A63B 37/06
[52] U.S. Cl. ...................................... 273/220; 273/218;
  260/998.14; 524/399; 524/432; 524/408
[58] Field of Search ........................ 273/220, 230, 218;
  524/908, 432, 399; 260/998.14

[56] References Cited

U.S. PATENT DOCUMENTS

| | | | |
|---|---|---|---|
| 2,838,556 | 6/1989 | Sullivan | 524/432 |
| 4,556,220 | 12/1985 | Tominaga et al. | 335/244 |
| 4,726,590 | 2/1988 | Molitor | 525/126 |
| 4,844,471 | 7/1989 | Terpnee et al. | 524/432 |
| 4,852,884 | 8/1989 | Sullivan | 524/322 |

*Primary Examiner*—Allan M. Lieberman

[57] ABSTRACT

The present invention is directed to an improved golf ball core which exhibits an increased COR over golf ball cores made of conventional elastomer blends without sacrificing compressibility. In particular, the present invention is a golf ball core having an elastomer resin, and at least one metal salt of an unsaturated carboxylic acid, filler, fatty acid, and peroxide initiator, the improvement comprising the core further containing from about 0.1 to about 5.0 phr of a zinc salt of a compound of the formula:

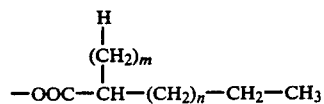

wherein n is n integer from 1-3, and m is an integer from 1-2.

30 Claims, No Drawings

GOLF BALL CORE

BACKGROUND OF THE INVENTION a. Field of the Invention

This invention relates generally to golf ball cores, and in particular, to golf ball cores which contain a zinc salt of a short branched chain saturated monocarboxylic acid. In particular, this invention relates to a golf ball core which contains zinc di-ethylhexoate. The present invention is useful because it provides a golf ball core having an improved COR from about 0.5% to about 2% over golf ball cores composed of conventional elastomer blends.

b. Prior Art

The distance a golf ball will travel when hit by a golf club is a function of many factors, including angle of trajectory, clubhead speed and coefficient of restitution. The coefficient of restitution ("COR") is a measurement familiar to those skilled in the golf ball art. One way to measure the COR is to propel a ball at a given speed against a hard massive surface, and measure its incoming and outgoing velocity. The COR is the ratio of the outgoing velocity to the incoming velocity and is expressed as a decimal.

The COR of a golf ball is a function of both the core and the cover. The greater the contribution of the core, the lesser need be the contribution from the cover. There is no United States Golf Association limit on the COR, but the initial velocity of the golf ball cannot exceed 250±5 feet/second. As a result, the industry goal for initial velocity is 255 feet/second, and the industry strives to maximize the COR without violating this limit.

Consequently, there has been a long-expressed interest in the industry for producing golf ball cores with high CORS, wherein the cover need not make as great a contribution to the core or vice versa. There has also been a long felt need in the golf ball industry to avoid impairing another characteristic of golf ball cores, compressibility, which is also a prerequisite to excellent play and good marketability.

The prior art discloses numerous cores wherein there is a tradeoff between the desirable characteristics of a high COR and compressibility. For example, U.S. Pat. No. 4,726,590 (Molitor) discloses a composition for one-piece golf ball cores having an improved COR. The core composition includes the following components: an elastomer cross-linkable with a free radical initiator catalyst, a metal salt of an alpha-acrylate or methacrylate, a free radical initiator catalyst, and a polyfunctional isocyanate. Although the maximum COR obtained with the Molitor invention is 0.815, there is decreasing compressibility with increasing concentrations of particular isocyanates.

U.S. Pat. No. 4,838,556 (Sullivan) discloses a solid golf ball having a solid core comprised of an elastomer or admixture of elastomers, at least one metal salt of an unsaturated carboxylic acid, a free radical initiator, and a dispersing agent. According to Sullivan, the core of this invention exhibits an increase in COR ranging from about 0.5 to about 2.0 percent over that of the closest prior art core which lacked a dispersing agent in its core composition. The highest COR obtained by Sullivan was 0.816. However, at this COR, the compressibility was lowest.

U.S. Pat. No. 4,852,884 (Sullivan) discloses a golf ball core formulation which incorporates a metal carbamate accelerator. The highest COR that Sullivan achieved, while still maintaining a satisfactory compressibility, was 0.807.

U.S. Pat. No. 4,844,471 (Terrence) discloses a golf ball core composition including dialkyl tin fatty acid. The highest COR attained in the invention, while maintaining a satisfactory compressibility, was 0.809.

U.S. Pat. No. 4,546,980 (Gendreau et al.) discloses a golf ball core which contains two or more free radical initiators, at least two of which exhibit a different reactivity during the curing process. According to Gendreau, golf ball core compositions containing at least two initiators, each with a different half-life (i.e, one long half life and one short half-life), yielded a golf ball product having an initial velocity of at least 0.5 feet/second higher than the initial velocity of the same golf ball product made with only one initiator. Gendreau did not address the problem of raising the COR while retaining sufficient compressibility.

It is an object of the invention to provide a core for a two-piece golf ball which provides a high COR without sacrificing compressibility.

It is a further object of the present invention to produce golf balls exhibiting superior playability while maintaining a satisfactory COR with a large component of the COR value contributed by the core.

SUMMARY OF THE INVENTION

The present invention constitutes an improvement over the prior art by further increasing the COR with the addition of from about 0.1 to about 5 parts per hundred parts resin by weight (phr) of zinc di-2-ethylhexoate. The present invention also solves the problem in the prior art of obtaining the highest possible COR without detracting from the good compression characteristics needed for a superior and therefore extremely marketable golf ball.

In particular, the present invention is an improved golf ball core comprising an elastomer such as polybutadiene resin, and at least one metal salt of an unsaturated carboxylic acid, filler, fatty acid, and peroxide initiator, with the improvement comprising the core further containing from about 0.1 to about 5.0 phr of a zinc salt of a compound of the formula:

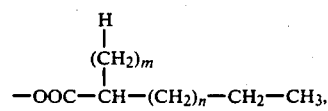

where n is an integer from 1-3 and m is an integer from 1-2.

DETAILED DESCRIPTION OF THE INVENTION

The present invention is directed to an improved golf ball core having a higher COR than previously achieved, while still maintaining a satisfactory compressibility. Generally, the golf ball core of the present invention comprises an elastomer mixture, at least one metallic salt of an unsaturated carboxylic acid, at least one peroxide initiator and a zinc salt of a short branched chain saturated monocarboxylic acid.

The short branched chain saturated monocarboxylic acid component of the present invention is selected from the zinc salts of compounds of the formula:

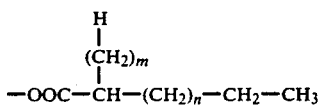

wherein n is an integer from 1-3, and m is an integer from 1-2 (Hereinafter referred to as Formula I). Preferably the compound is zinc di-2-ethylhexoate with the formula:

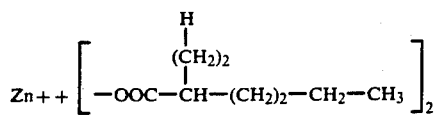

(hereinafter Formula II). Zinc di-2-ethylhexoate is commercially available under the trade name Octoate Z from R.T. Vanderbilt, Norwalk, Conn. The zinc salt of the unsaturated carboxylic acid is generally soluble in the elastomer base, or is readily dispersable.

In the present invention, the elastomer is preferably polybutadiene resin, but it can also comprise mixtures of polybutadiene with other elastomers. In resin mixtures, it is preferred that the base elastomer resin have a relatively high molecular weight. The broad range for the (weight-average) molecular weight of the base elastomer is from about 100,000 to about 500,000. Most preferably, the base resin is cis-polybutadiene having a weight-average molecular weight of about 100,000 to about 500,000.

The golf ball cores of the present invention may additionally contain suitable compatible modifying ingredients including, but not limited to fillers. Any known and conventional filler material, or mixtures thereof, may be used. Such fillers should be in finely divided form, as for example, in size generally less-than about 20 mesh and preferably less than about 100 mesh U.S. standard size. Suitable fillers include silica, silicates, zinc oxide, carbon black, cork, titania, cotton flock, cellulose flock, leather fiber, plastic, asbestos, glass fibers, metal carbonates, and talc. Particularly useful is the oxide or carbonate of the cation used in forming the metal salt of the unsaturated carboxylic acid component. Low molecular weight fatty acids, such as stearic acid, appear to have beneficial effects. High specific gravity fillers such as barium sulfate, lead oxide, or most preferably zinc oxide may be added to the core to increase the weight of the ball as desirable or as necessary to have the ball reach or closely approach the USGA weight limit of 1.620 ounces. In addition, small amounts of other compatible rubbers may be used.

The elastomer is cross-linked by the free radical initiator. The free radical initiator included in the core composition is any known polymerization initiator which decomposes during the cure cycle. The amount of the selected initiator present is dictated only by the requirements of catalytic activity as a polymerization initiator. Suitable initiators include peroxides, persulfates, azo compounds, and hydrazides. Peroxides which are commercially available are conveniently used in the present invention, generally in amounts of from about 0.1 to about 10.0 phr. Examples of suitable peroxides for the purposes of the present invention include dicumyl peroxide, n-butyl 4,4'-bis(tbutylperoxy)valerate, 1,1-bis(t-butylperoxy)-3,3,5-trimethylcyclohexane, di-t-butyl peroxide, 2,5-dimethyl-2,5-di(t-butylperoxy)hexyne-3 and 2,5-di-(t-butylperoxy)-2,5-dimethylhexane, as well as mixtures thereof.

In the present invention, in the preferred embodiment, the golf ball core composition suitable for use in the production of the present invention comprises:
(a) about 100 parts of an elastomer resin;
(b) about 30 to about 60 phr of at least one metal salt of an unsaturated carboxylic acid;
(c) about 10 to about 20 phr of at least one filler;
(d) about 4 to about 6 phr of at least one fatty acid;
(e) about 1 to about 3 phr of at least one peroxide initiator; and
(f) about 0.1 to about 5.0 phr of a zinc salt of a short branched chain saturated monocarboxylic acid.

Preferably, the golf ball core comprises from about 1.0 to about 5.0 phr of a zinc salt of the compound according to Formula I. More preferably, the golf ball core comprises about 1.0 to about 5.0 phr of a zinc salt of the compound according to Formula II. Most preferably, the golf ball core comprises about 1.0 phr of a zinc salt of compound according to Formula II.

Except for addition of the zinc salt of branched short chain saturated monocarboxylic acid, the golf ball core composition of the present invention is manufactured using conventional techniques. In the preferred embodiment, the method for producing a golf ball core comprises:
(a) mixing with approximately 100 parts of an elastomer resin about 30 to 60 phr of at least one metal salt of an unsaturated carboxylic acid, about 10 to 20 phr of at least one filler, about 4 to 6 phr of at least one fatty acid, and about 0.1 to about 5.0 phr of a zinc salt of a compound according to Formula I to form a composition which does not reach polymerization temperatures during the blending of the various components;
(b) adding about 1 to about 3 phr of at least one peroxide initiator to the composition to form slugs; and
(c) compression molding and curing said slugs to form golf ball cores.

Preferably, there is added about 1.0 to about 5.0 phr of a zinc salt of the compound according to Formula I. More preferably, there is added about 1.0 to about 5.0 phr of a zinc salts of the compound according to Formula II. Most preferably, there is added about 1.0 phr of a zinc salt of a compound according to Formula II.

The elastomer resins, metal salts of unsaturated carboxylic acids, fillers, fatty acid and zinc salt of the compound according to Formula I or Formula II are blended for about seven minutes an internal mixer such as a Banbury mixer. The mixing is desirably conducted in such a manner that the composition does not reach incipient polymerization temperatures during the blending of the various components. As a result of shear during mixing, the temperature rises to about 200° F.

Free radical initiator catalysts such as peroxides are admixed with the core composition so that on the application of heat and pressure, a complex curing or crosslinking reaction takes place. Mixing is continued until the temperature reaches about 220° F. whereupon the batch is discharged onto a two roll mill, mixed for about one minute and sheeted out.

The sheet is then placed in a Barwell preformer and slugs are produced. The composition can be formed into a core structure by any one of a variety of molding techniques, e.g., injection, compression, or transfer molding. For example, the slugs can be subjected to compression molding at about 320° F. for about 14 minutes with cooling effected by about 8 minutes at a mold temperature of about 60° F., followed by about 4 hours at room temperature.

Usually the curable component of the composition will be cured by heating the composition at elevated temperatures on the order of from about 275° F. to about 350° F., preferably and usually from about 290 F. to about 325° F., with molding of the composition occurring simultaneously with the curing thereof. When the compositon is cured by heating, the time required for heating will normally be short, generally from about 10 to about 20 minutes, depending upon the particular curing agent used. Those of ordinary skill in the art relating to free radical curing agents for polymers are knowledgeable about adjustments of cure times and temperature required to effect optimum results with any specific free radical agent.

After molding, the core is removed from the mold and its surface is preferably treated to facilitate adhesion to the covering materials. Surface treatment is accomplished by any of the several techniques known in the art, such as corona discharge ozone treatment, sand blasting, and the like. The molded core are subjected to a centerless grinding operation whereby a thin layer of the molded core is removed to produce a round core having a diameter of 1.545 inches. The core is converted into a golf ball by providing at least one layer of covering material thereon, ranging in thickness from about 0.050 to about 0.250 inch and preferably from about 0.060 to about 0.090 inch.

The cover composition preferably is made from ethylene-acrylic acid or ethylene-methacrylic acid copolymers which are partially neutralized with mono or polyvalent metals such as sodium, potassium, lithium, calcium, zinc, or magnesium. The cover composition can be formed via injection at about 380° F. to about 450° F. into smooth surfaced hemispherical shells which are then positioned around the core in a dimpled golf ball mold and subjected to compression molding at 200°–300° F. for 2–10 minutes, followed by cooling at 50°–70° F. for 2–10 minutes, to fuse the shells together to form a unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further processing steps such as buffing, painting, and marking.

The term "solid cores" as used herein refers not only to one piece cores but also to those cores having a separate solid layer beneath the cover and above the core as in U.S. Pat. No. 4,431,193, and other multilayer and/or non-wound cores. Wound cores are generally produced by winding a very large elastic thread around a solid or liquid filled balloon center. Generally, the elastic thread is wound around the center to produce a finished core of about 1.4 to 1.6 inches in diameter.

Employing the ingredients tabled below, golf ball cores having a finished diameter of 1.545 inches were produced by compression or molding and subsequent removal of a surface layer by grinding. Ingredients are expressed in phr for each formulation, and the resulting COR and compression achieved for each formulation is set forth.

TABLE I

| Formulations | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| BR-100[1] | 500 | 500 | 500 | 500 | 500 | 500 | 500 | 500 | 500 | 500 | 500 | 500 | 500 | 500 |
| RR ZDA[2] | 200 | 200 | 200 | 200 | 200 | 200 | 200 | 200 | 200 | 200 | 200 | 200 | 200 | 200 |
| ZnO | 75 | 75 | 75 | 75 | 75 | 75 | 75 | 75 | 75 | 75 | 75 | 75 | 75 | 75 |
| Stearic Acid | 25 | 25 | 25 | 25 | 25 | 25 | 25 | 25 | 25 | 25 | 25 | 25 | 25 | 25 |
| *Trig 17/40[3] | 4.5 | 4.5 | 4.5 | 4.5 | 4.5 | 4.5 | 4.5 | 4.5 | 4.5 | 4.5 | 4.5 | 4.5 | 4.5 | 4.5 |
| **Luperco 130 × L[4] | 1.5 | 1.5 | 1.5 | 1.5 | 1.5 | 1.5 | 1.5 | 1.5 | 1.5 | 1.5 | 1.5 | 1.5 | 1.5 | 1.5 |
| Mondur M[5] | 5.0 | 5.0 | 5.0 | 5.0 | 5.0 | 5.0 | 5.0 | 5.0 | 5.0 | 5.0 | 5.0 | 5.0 | 5.0 | 5.0 |
| Dodecane-thiol | 5.0 | 5.0 | 5.0 | 5.0 | — | 5.0 | 5.0 | 5.0 | 5.0 | 5.0 | 5.0 | 5.0 | 5.0 | 5.0 |
| Vanax PY[6] | — | 5.0 | 25.0 | — | — | — | — | — | — | — | — | — | — | — |
| Vanax A[7] | — | — | — | 5.0 | 5.0 | 10.0 | — | — | — | — | — | — | — | — |
| Vanfre TK[8] | — | — | — | — | — | — | 5.0 | 25.0 | — | — | — | — | — | — |
| Octoate Z | — | — | — | — | — | — | — | — | 5.0 | 25.0 | — | — | — | — |
| Darvan No. 1[9] | — | — | — | — | — | — | — | — | — | — | 5.0 | 25.0 | — | — |
| Darvan No. 2[10] | — | — | — | — | — | — | — | — | — | — | — | — | 5.0 | 25.0 |
| WT grams | 37.5 | | | | | | 37.4 | 38.2 | 37.7 | 37.1 | 37.6 | 38.0 | 37.7 | 37.8 |
| Comp.[11] | 55 | | | | | | 51 | 62 | 41 | 61 | 50 | 48 | 47 | 50 |
| e[12] | .805 | | | | | | .804 | .769 | .820 | .805 | .814 | .803 | .816 | .797 |

*Has a half-life of 2½ minutes at 320° F.
**Has a half-life of 22 minutes at 320° F.
[1]Better processing polybutadiene.
[2]Zinc diacrylate.
[3]4,4-di-t-butylperoxy n-butyl valerate with inorganic filler (Naury Inc.)
[4]Luperco 130-XL: 2,5-dimethyl-2,5-di(t-butylperoxy)hexyne-3 (Penwalt-Lucicol).
[5]Mondur M: the difunctional isocyanate; diphenylmethane-4,4'-diisocyanate MDI (Mobay Corp.)
[6]23% poly-o-dinitrosobenzene polymer in wax.
[7]4,4'-dithiodimorpholine.
[8]Inorganic acid on an inert carrier.
[9]Dispersing agent of sodium salts of polymerized alkyl napthalene sulfonic acid.
[10]Sodium salts of polymerized substituted benzoid alkyl sulfonic acids for use with zinc oxide.
[11]Riehle compression is a measurement of the deformation of a golf ball in inches under a fixed static load of 225 pounds.
[12]Coefficient of restitution (e) was measured by firing the resulting golf ball in an air cannon at a velocity of 125 feet per second against a steel plate which is possitioned 12 feet from the muzzle of the cannon. The rebound velocity was then measured. The rebound velocity was divided by forward velocity to give coefficient of resolution.

The range for COR values for Octoate Z is 0.815 to 0.825. As seen in Table I at column (formulation) 9, a core composition containing 500 parts of polybutadiene and 5 parts of Octoate Z gives the highest COR: 0.820. This formulation corresponds to 1 phr of zinc-di-2- ethylhexoate in the core composition. Substantially increasing the Octoate Z to 5 phr, as in formulation 10, caused no increase in COR relative to the control formulation. Formulations 11 and 13, which add the dispersing agents Darvan No. 1 and Darvan No. 2 respectively at 1 phr and contain no Octoate Z, provide CORs of 0.814 and 0.816 respectively. These values are increased relative to the control formulation, i.e., formulation 1 with a COR of 0.805. Increasing the concentration of dispersing agents Darvan No. 1 and No. 2 to 5 phr, such as in formulations 12 and 14 respectively, resulted in CORs that were less than the control formulation.

We have also found that in formulations (not shown) comparable to Formulation 9 of Table 1 which contained Octoate Z at 1 phr, increasing the concentration of the peroxide initiators in the batch material eventually led to a drop in COR values (Except for one trial in which the experimental cores showed a decreased COR at 4.6 phr of peroxide initiator).

It is to be understood that the present invention is not limited to the above embodiments, and that various changes and modifications may be made in the invention without departing from the spirit and scope thereof.

What is claimed is:

1. In a golf ball core having the following: a diene elastomer having a weight average molecular weight from about 100,000 to about 500,000, at least one zinc or lead salt of an unsaturated carboxylic acid, a filler having a size of less than about 20 mesh, a low molecular weight fatty acid, and a free radical initiator; the improvement comprising solid core further containing from about 0.1 to about 5.0 phr of the zinc salt of a short branched chain saturated carboxylic acid according to Formula I:

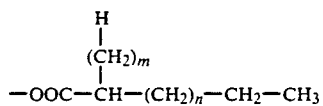

wherein n is an integer from 1-3, and m is an integer from 1-2.

2. The golf ball core according to claim 1, wherein said core contains from about 1.0 to about 5.0 phr of the zinc salt of the short branched chain saturated carboxylic acid according to Formula I.

3. The golf ball core according to claim 1, wherein said core contains about 1 phr of the zinc salt of the short branched chain saturated carboxylic acid according to Formula I.

4. The golf ball core according to claim 3, wherein said zinc salt is a short branched chain saturated carboxylic acid according to Formula II:

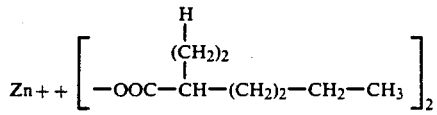

5. The golf ball core according to claim 1 wherein said filler is zinc oxide having a size of less than about 20 mesh.

6. An improved gold ball core comprising about 100 parts of a diene elastomer having a weight average molecular weight form about 100,00 to about 500,000, about 30 to about 60 phr of a zinc or lead salt of an unsaturated carboxylic acid, about 4 to about 6 phr of at least one low molecular weight fatty acid, about 1 to about 3 phr of at least one free radical initiator, and from about 0.1 to about 5.0 phr of a zinc salt of a short branched chain saturated carboxylic acid according to Formula I.

7. The improved golf ball core according to claim 6 wherein said core comprises about 1.0 to about 5.0 phr of a zinc salt of a short branched chain saturated carboxylic acid according to Formula I.

8. The improved golf ball core according to claim 7 wherein said core comprises about 1.0 phr of a zinc salt of a short branched chain saturated carboxylic acid according to Formula I.

9. The improved golf ball core according to claim 7 wherein said zinc salt is a short branched chain saturated carboxylic acid according to Formula II.

10. The improved golf ball core according to claim 8 wherein said zinc salt is a short branched chain saturated carboxylic acid according to Formula II.

11. The improved golf ball core according to claim 7 wherein said elastomer resin is cispolybutadiene.

12. The improved golf ball core according to claim 7 wherein said peroxide initiator is a member of the group consisting of dicumyl peroxide, n-butyl 4,4'-bis(t-butylperoxy)valerate, 1,1-bis(t-butylperoxy)-3,3,5-trimethylcyclohexane, d-t-butylperoxide, 2,5-di-(t-butylperoxy)-2,5-dimethylhexane, 2,5-dimethyl-2,5-di-(t-butylperoxy)hexyne-3 and mixtures thereof.

13. The improved golf ball core according to claim 7 wherein said low molecular weight fatty acid is stearic acid.

14. The improved golf ball core according to claim 7 wherein said golf ball further comprises one or more fillers selected from the group consisting of lead oxide, barium sulfate, silica, silicates, zinc oxide, carbon black, cork, titania, cotton flock, cellulose flock, plastic, asbestos, glass fiber, metal carbonates, leather fiber, and talc.

15. The improved golf ball core according to claim 14 wherein said filler is zinc oxide.

16. The improved golf ball core according to claim 7 wherein said unsaturated carboxylic acid is selected from the group consisting of acrylic acid, methacrylic acid, itaconic acid, crotonic acid, sorbic acid, and mixtures thereof.

17. In a method of producing a golf ball core, said method comprising mixing a diene elastomer having a weight-average molecular weight from about 100,000 to about 500,000, at least one zinc or lead salt of an unsaturated carboxylic acid, a filler having a size of less than about 20 mesh, a low molecular weight fatty acid, and a free radical initiator, the improvement comprising the step of:

adding to said mixture from about 0.1 to about 5.0 phr of a zinc salt of a short branched chain saturated carboxylic acid according to Formula I.

18. The method according to claim 17, wherein the improvement comprises the step of adding to said mixture from about 1.0 to about 5.0 phr of a zinc salt of a short branched chain saturated carboxylic acid according to Formula I.

19. The method according to claim 18, the improvement comprising the step of adding to said mixture about 1.0 phr of a zinc salt of the short branched chain saturated carboxylic acid according to Formula I.

20. The method according to claim 19, the improvement comprising the step of adding to said mixture about 1.0 phr of a zinc salt of the short branched chain saturated carboxylic acid according to Formula I.

21. The method according to claim 17, wherein the filler is zinc oxide.

22. A method for producing a golf ball core comprising:
   (a) mixing together approximately 100 parts of a diene elastomer having a weight-average molecular weight from about 100,000 to about 5000,000, about 30 to about 60 phr of at least one metal salt of an unsaturated carboxylic acid, about 10 to about 20 phr of at least one filler having a size of less than about 20 mesh, about 4 to about 6 phr of at least one low molecular weight fatty acid, and about 0.1 to about 5.0 phr of a zinc salt of a short branched chain unsaturated carboxylic acid according to Formula I, to form a composition which does not reach polymerization temperatures during the mixing of the various components;
   (b) adding about 1 to about 3 phr of at least one free radical initiator to said composition to form slugs; and
   (c) compression molding and curing said slugs to form golf ball cores.

23. The method according to claim 22 wherein in step (a) about 1.0 phr of a zinc salt of the short branched chain saturated carboxylic acid according to Formula I is mixed.

24. The method according to claim 22 wherein in step (a) about 1.0 to about 5.0 phr of a zinc salt of the short branched chain saturated carboxylic acid according to Formula II is mixed.

25. The method according to claim 24 wherein in step (a) about 1 phr of a zinc salt of the short branched chain saturated carboxylic acid according to Formula II is mixed.

26. The method according to claim 22 wherein said filler is zinc oxide.

27. The golf ball core of claims 1 or 5 wherein said free radical initiator is a peroxide.

28. The improved golf ball core of claim 6 wherein said free radical initiator is a peroxide.

29. The method of claims 22 or 23 wherein said free radical initiator is a peroxide.

30. The improved golf ball core of claim 6 wherein said peroxide is a member of the group consisting of: dicumyl peroxide, n-butyl 4,4'-bis(t-butylperoxy)valerate, 1,1-bix(t-butylperoxy)-3,3,5-trimethylcyclohexane, di-t-butyl peroxide, 2,5-dimethyl-2,5-di(t-butylperoxy)hexyne-3, and 2,5-di-(t-butylperoxy)-2,5-dimethylhexane, and mixtures thereof.

* * * * *